(12) United States Patent
He et al.

(10) Patent No.: US 11,030,066 B2
(45) Date of Patent: Jun. 8, 2021

(54) DYNAMIC APPLICATION DECOMPOSITION FOR EXECUTION IN A COMPUTING ENVIRONMENT

(71) Applicant: EMC IP Holding Company LLC, Hopkinton, MA (US)

(72) Inventors: Xuebin He, Westwood, MA (US); Alex Robbins, Mansfield, MA (US); James R. King, Norwood, MA (US); Amy Seibel, Cambridge, MA (US); Victor Fong, Medford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/668,676

(22) Filed: Oct. 30, 2019

(65) Prior Publication Data
US 2021/0133066 A1    May 6, 2021

(51) Int. Cl.
*G06F 11/30*    (2006.01)
*G06F 11/07*    (2006.01)
*G06F 11/34*    (2006.01)
*G06F 11/36*    (2006.01)
*G06F 8/70*    (2018.01)

(52) U.S. Cl.
CPC ........ *G06F 11/302* (2013.01); *G06F 11/0772* (2013.01); *G06F 11/3466* (2013.01); *G06F 11/3612* (2013.01); *G06F 8/70* (2013.01)

(58) Field of Classification Search
CPC .............. G06F 11/302; G06F 11/0772; G06F 11/3466; G06F 11/3612; G06F 8/70
USPC ................................................. 717/124–134
See application file for complete search history.

(56) References Cited

U.S. PATENT DOCUMENTS

| 5,598,564 | A  | * | 1/1997 | Barker, III | ............ | G06F 13/385 |
| | | | | | | 717/126 |
| 6,263,491 | B1 | * | 7/2001 | Hunt | ...................... | G06F 9/465 |
| | | | | | | 714/E11.209 |
| 6,654,949 | B1 | * | 11/2003 | Fraenkel | ............. | G06F 11/3466 |
| | | | | | | 714/E11.2 |

(Continued)

OTHER PUBLICATIONS

Archer et al, "Decomposing Feature Models: Language, Environment, and Applications", IEEE, pp. 600-603 (Year: 2011).*

(Continued)

*Primary Examiner* — Anil Khatri
(74) *Attorney, Agent, or Firm* — Ryan, Mason & Lewis, LLP

(57) ABSTRACT

Techniques for dynamic decomposition of an application executing in a computing environment are provided. For example, an apparatus comprises at least one processing platform comprising one or more processing devices. The at least one processing platform is configured to execute a portion of an application program in a first virtual computing element, wherein the application program comprises one or more portions of marked code, receive a request for execution of one of the one or more portions of marked code, decide whether to execute the portion of marked code identified in the request in the first virtual computing element or in a second virtual computing element, and cause the portion of marked code identified in the request to be executed in the second virtual computing element, when it is decided to execute the portion of the marked code in the second virtual computing element.

20 Claims, 7 Drawing Sheets

(56) References Cited

U.S. PATENT DOCUMENTS

| | | | | |
|---|---|---|---|---|
| 6,959,441 | B2* | 10/2005 | Moore | G06F 9/46 |
| | | | | 719/310 |
| 7,062,756 | B2* | 6/2006 | Kamen | H04L 29/06 |
| | | | | 717/127 |
| 7,203,926 | B2* | 4/2007 | Bogle | G06F 9/45512 |
| | | | | 714/E11.21 |
| 7,222,218 | B2* | 5/2007 | Dutt | G06F 8/451 |
| | | | | 710/244 |
| 7,493,630 | B2* | 2/2009 | Hunt | G06F 9/465 |
| | | | | 719/330 |
| 7,603,664 | B2* | 10/2009 | Dutt | G06F 8/445 |
| | | | | 717/136 |
| 7,788,640 | B2* | 8/2010 | Grimaldi | G06F 8/73 |
| | | | | 717/123 |
| 8,245,199 | B2* | 8/2012 | Chen | G06F 11/348 |
| | | | | 717/130 |
| 8,301,757 | B2* | 10/2012 | Catlin | H04M 3/4938 |
| | | | | 709/224 |
| 8,375,368 | B2* | 2/2013 | Tuck | G06F 11/3466 |
| | | | | 717/130 |
| 8,468,502 | B2* | 6/2013 | Lui | G06F 11/3636 |
| | | | | 717/127 |
| 8,631,387 | B2* | 1/2014 | Henderson | G06F 8/355 |
| | | | | 717/108 |
| 8,812,269 | B1* | 8/2014 | Orofino, II | G06F 8/34 |
| | | | | 703/1 |
| 8,918,448 | B2* | 12/2014 | DeLuca | G06F 8/61 |
| | | | | 709/201 |
| 8,918,765 | B2* | 12/2014 | Dearman | G06F 11/3636 |
| | | | | 717/130 |
| 9,235,727 | B2* | 1/2016 | Thomas | G06F 21/6236 |
| 9,910,680 | B2* | 3/2018 | Goetz | G06F 9/45516 |

OTHER PUBLICATIONS

Guo et al, "Interactively Decomposing Composite Changes to Support Code Review and Regression Testing", IEEE, pp. 118-127 (Year: 2017).*
Safan et al, "Decomposing the Rationale of Code Commits: The Software Developer's Perspective", ACM, pp. 397-408 (Year: 2019).*
Aristidou et al, "Dynamic Simulation of Large-Scale Power Systems Using a Parallel Schur-Complement-Based Decomposition Method", IEEE, pp. 2561-2570 (Year: 2014).*
Demmel et al, "The Generalized Schur Decomposition of an Arbitrary Pencil A-AB: Robust Software with Error Bounds and Applications. Part 1: Theory and Algorithms", ACM, pp. 160-174 (Year: 1993).*
Koo et al, "Functional Test Generation Using Design and Property Decomposition Techniques", ACM, pp. 1-33 (Year: 2009).*
Alkhalid et al, "Software Architecture Decomposition Using Clustering Techniques", IEEE, pp. 806-811 (Year: 2013).*
Sasson, "Decomposition Techniques Applied to the Nonlinear Programming Load-Flow Method", IEEE, pp. 78-82 (Year: 1970).*
Wikipedia, "Platform as a Service," https://en.wikipedia.org/wiki/Platform_as_a_service, 2019, 6 pages.
Wikipedia, "Function as a Service," https://en.wikipedia.org/wiki/Function_as_a_service, 2019, 2 pages.
Wikipedia, "OS-Level Virtualization," https://en.wikipedia.org/wiki/OS-level_virtualization, 2019, 4 pages.
Wikipedia, "AspectJ," https://en.wikipedia.org/wiki/AspectJ, 2019, 5 pages.
Wikipedia, "Kubernetes," https://en.wikipedia.org/wiki/Kubernetes, 2019, 13 pages.
Wikipedia, "Node.js," https://en.wikipedia.org/wiki/Node.js, 2019, 12 pages.
Google Cloud, "Knative," https://cloud.google.com/knative/, 2019, 8 pages.

* cited by examiner

```
module.exports = {
    function1: function (arg1, arg2) {
        ...
    },
    function2: function (arg1) {
        ...
    }
}
```

```
const marked_function = require ('function_wrapper')

module.exports = {
    function1: marked_function ('my-functions1', function (arg1, arg2) {
        ...
    }),
    function2: function (arg1) {
        ...
    }
}
```

602  node deployment-descriptor-transformation.js <original knative service file> <root directory> <output file>

FIG. 6B

604  node deployment-descriptor-transformation.js sample/service.yml sample/ sample/func-services.yaml

FIG. 6C

606
```
kubectl apply -f service.yml
kubectl apply -f func-services.yml
```

FIG. 6D

608
```
@Marked_function ("say-hello")
public String sayHello (String name1, String name2) {
    ...
}
```

FIG. 6E

610  node deployment-descriptor-transformation.js ../sample/service.yml ../sample ../sample/func-services.yaml com.example.helloworld

DYNAMIC APPLICATION DECOMPOSITION FOR EXECUTION IN A COMPUTING ENVIRONMENT

FIELD

The field relates generally to computing environments, and more particularly to techniques for dynamic decomposition of an application executing in such computing environments.

BACKGROUND

Decomposing a software application program (application) into jobs or functions that execute in a computing environment is very time consuming and takes a lot of manual work. Such computing environments may include cloud computing services including Platform-as-a-Service (PaaS) or Function-as-a-Service (FaaS). PaaS is a computing service implemented in a cloud computing environment in which a third-party provider (PaaS provider) provides hardware and software tools (hosted on the PaaS provider infrastructure) to enable a user to develop and manage an application. Thus, the user develops and manages the application and the service platform is managed by the PaaS provider. In contrast, FaaS is a computing service implemented in a cloud computing environment in which a third-party provider (FaaS provider) provides hardware and software tools (hosted on the FaaS provider infrastructure) to enable a user to develop and manage application functions without the complexities of developing and deploying a monolithic application. Thus, the user develops and manages the application functions and the service platform is managed by the FaaS provider.

For example, decomposing an application involves refactoring on both application code and the test suite, as well as creating separate container images and deployment manifests if the functions service does not support raw code compilation. After the application is refactored into jobs or functions, it is still quite difficult to maintain, as there could be tens of jobs and hundreds of functions for a typical application, making long-term maintenance difficult and cost heavy.

SUMMARY

Embodiments of the invention provide techniques for dynamic decomposition of an application executing in a computing environment.

For example, in one embodiment, an apparatus comprises at least one processing platform comprising one or more processing devices. The at least one processing platform is configured to execute a portion of an application program in a first virtual computing element, wherein the application program comprises one or more portions of marked code, receive a request for execution of one of the one or more portions of marked code, decide whether to execute the portion of marked code identified in the request in the first virtual computing element or in a second virtual computing element, and cause the portion of marked code identified in the request to be executed in the second virtual computing element, when it is decided to execute the portion of the marked code in the second virtual computing element.

Advantageously, illustrative embodiments provide a dynamic application decomposition framework that enables developers to mark their application code where a possible new function spawn could be made. At runtime, calls made to the marked functions are intercepted, and a dynamic determination is made whether to run the function in a new separate container (i.e., second virtual computing element) or in the original local container (i.e., first virtual computing element). If the determination is made that the function should be run in a separate container, calls to the function are redirected to the appropriate container automatically. While some embodiments are well suited for implementation in PaaS/FaaS architectures, alternative embodiments can be implemented in any suitable computing environment that would benefit from one or more of the dynamic application decomposition functionalities.

These and other features and advantages of the invention will become more readily apparent from the accompanying drawings and the following detailed description.

BRIEF DESCRIPTION OF THE DRAWINGS

FIG. 5A depicts an example of code to execute part of an application as a function with which one or more illustrative embodiments can be implemented.

FIG. 5B depicts an example of code to execute part of an application as a function with dynamic application decomposition, according to an illustrative embodiment.

FIGS. 6A through 6E depict examples of code associated with dynamic application decomposition, according to illustrative embodiments.

DETAILED DESCRIPTION

Figure 1:
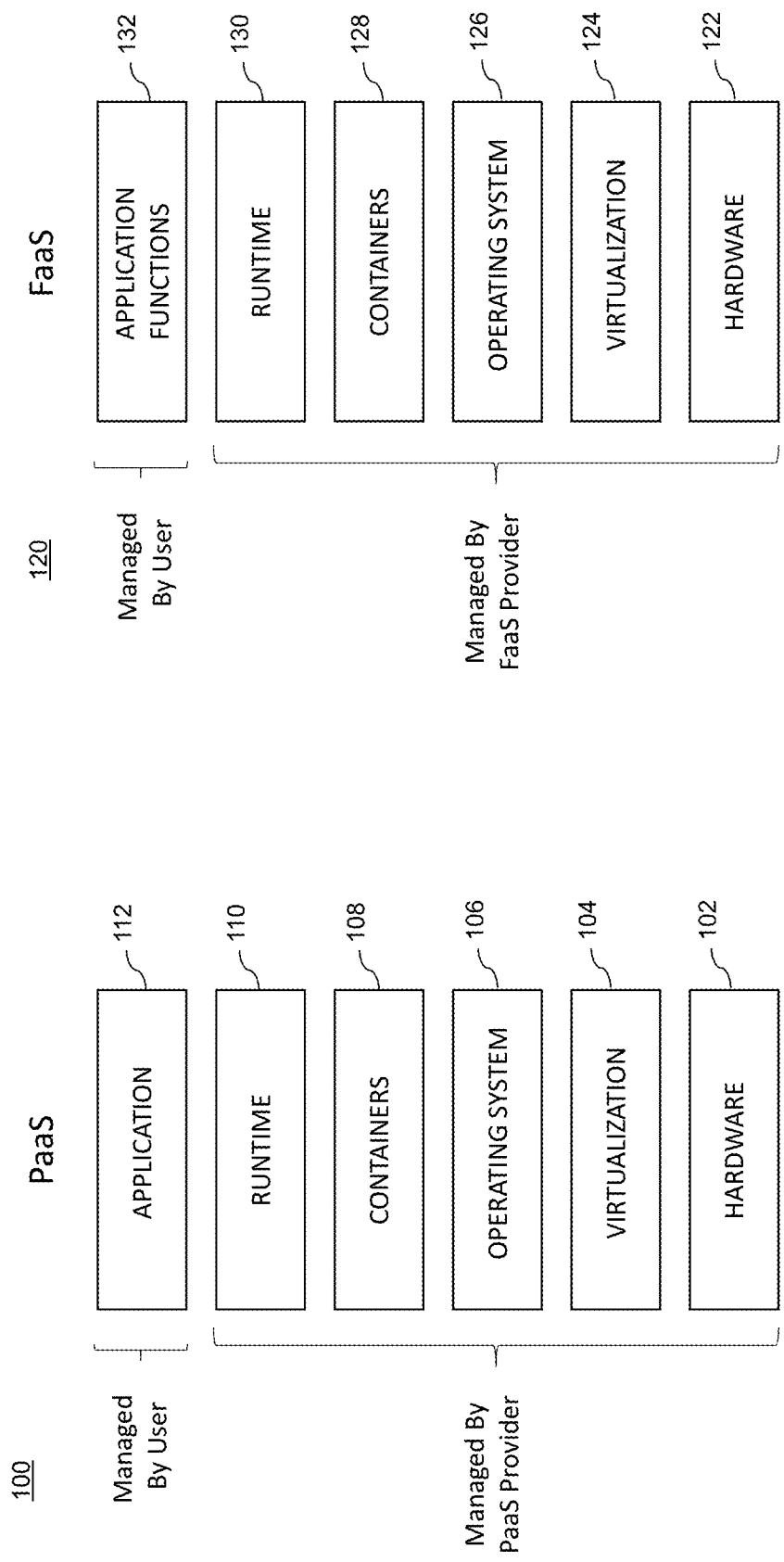
FIG. 1A depicts an example of a PaaS computing environment with which one or more illustrative embodiments can be implemented.
FIG. 1B depicts an example of a FaaS computing environment with which one or more illustrative embodiments can be implemented.

Illustrative embodiments may be described herein with reference to exemplary computing environments such as, but not limited to, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "computing environment," "cloud environment," "cloud computing platform," "cloud infrastructure," "data repository," "data center," "data processing system," "computing system," "data storage system," "information processing system," and the like as used herein are intended to be broadly construed, so as to encompass, for example, any arrangement of one or more processing devices.

As mentioned above in the background section, decomposing an existing application into jobs or functions to run in a PaaS or FaaS computing environment is an effort-heavy and error-prone process which requires a significant amount of tedious and manual work. Even after functions are successfully created, they are difficult to maintain. Some specific challenges will now be described.

(i) Effort required to decompose an application. Deconstructing a monolithic style application into jobs or functions requires a lot of tedious work and is very time consuming. It involves refactoring on application code, test suites, build scripts, continuous integration/continuous delivery (CI/CD) pipelines, Docker images, and deployment manifests.

(ii) Microservice or function optimization. It is very difficult to optimize between performance and hosting cost for jobs or functions. It typically involves choosing strategic container breakoff points, then trial-and-error to obtain performance and billing information for further optimization. With the large amount of time required to take out new functions and microservices, this optimization process is effort-heavy and expensive.

(iii) On-going maintenance. After the application is broken down into what could be hundreds of independent functions, it becomes difficult to manage all of them. Modifying existing functionality would require changing multiple functions, causing on-going development and long-term maintenance to be time consuming and error-prone.

(iv) Dynamic call-flow configuration. Once microservices and functions are defined, there is typically no way to control their behavior dynamically without changing source code and re-deploying again. The branch-out decisions are made at development time with little run-time control.

(v) Dynamic call-flow configuration with telemetry. The branch-out decisions are made at development time without any consideration of runtime dynamics, including executing time, size of input, traffic volume, and available resources. Once the decisions are made, applications have no concerns over run-time environments, causing the application to execute with suboptimal performance.

(vi) Cold start wait time. Since there is no control over whether to branch out into a separate container in a runtime environment, when a separated container is not yet required, the caller would need to wait for the container to initialize. This initialization wait time depends on container start-up time and application start-up time, causing dissatisfied user expectations.

Illustrative embodiments overcome the above and other drawbacks associated with existing approaches. For example, illustrative embodiments provide a solution to allow for the dynamic decomposition of an application into long-running jobs or short-living functions that can execute in PaaS or FaaS computing environments. Illustrative embodiments remove the need for manual refactoring of code and allow developers to mark functions they wish to be run separately in their own container(s) using one of several illustrative methods described herein. At runtime, in accordance with illustrative embodiments, the application runs as it normally would (for example, in a single local container). As the application executes, if a marked function is to be invoked, a controller determines whether to invoke the function in a separate container, or to invoke the function in the local container. This decision is based on developer-defined policy and telemetry data. If the controller decides the function should be run separately, a new container for that function is spawned. With each additional request to that function, the controller again dynamically decides where to send that request (either to one of the existing containers, or to a new container). The newly spawned function containers are horizontally scalable.

Such an approach has many benefits. For example, illustrative embodiments:

(i) Use code markers to identify pieces of code to be broken into separate containers without the need for intensive manual refactoring on both application code and the test suite.

(ii) Reduce cost by scaling out only the functions that need to be scaled instead of scaling the entire monolithic application or microservice.

(iii) Able to dynamically adjust call-flow based on user policy.

(iv) Automatically adjust call-flow based on real-time telemetry information.

(v) Use predefined policy to dynamically route invocation traffic to both local container and remote container(s) for quick AB testing.

(vi) Reduce wait-time for cold-start for function containers based on current traffic volume.

Prior to describing illustrative embodiments, some relevant features associated with PaaS and FaaS computing environments will be described.

FIG. 1A depicts an example of a PaaS computing environment 100 with which one or more illustrative embodiments can be implemented. As shown, a PaaS computing environment comprises the following layers/capabilities: hardware 102, virtualization 104, operating system 106, containers 108, runtime environment 110, and application 112. These layers/capabilities are well known to those of ordinary skill in the art and thus are not further described. As is also known, hardware 102, virtualization 104, operating system 106, containers 108 and runtime environment 110 are typically managed by the PaaS provider, while the application 112 itself is developed and managed by the user.

FIG. 1B depicts an example of a FaaS computing environment 120 with which one or more illustrative embodiments can be implemented. As shown, a FaaS computing environment comprises the following layers/capabilities: hardware 122, virtualization 124, operating system 126, containers 128, runtime environment 130, and application functions 132. Again, these layers/capabilities are well known to those of ordinary skill in the art and thus are not further described. As is also known, hardware 122, virtualization 124, operating system 126, containers 128 and runtime environment 130 are typically managed by the FaaS provider, while the application functions 132 are developed and managed by the user.

Thus, for example in PaaS computing environment 100, a developer (user) deploys its application 112 and the PaaS infrastructure (102 through 110) takes care of deploying the application for execution on one or more servers. In contrast, for example in FaaS computing environment 120, a developer (user) can deploy a single function or multiple functions 132 that are part of an application and the FaaS infrastructure (122 through 130) takes care of deploying the one or more application functions for execution on one or more servers.

Figure 2:
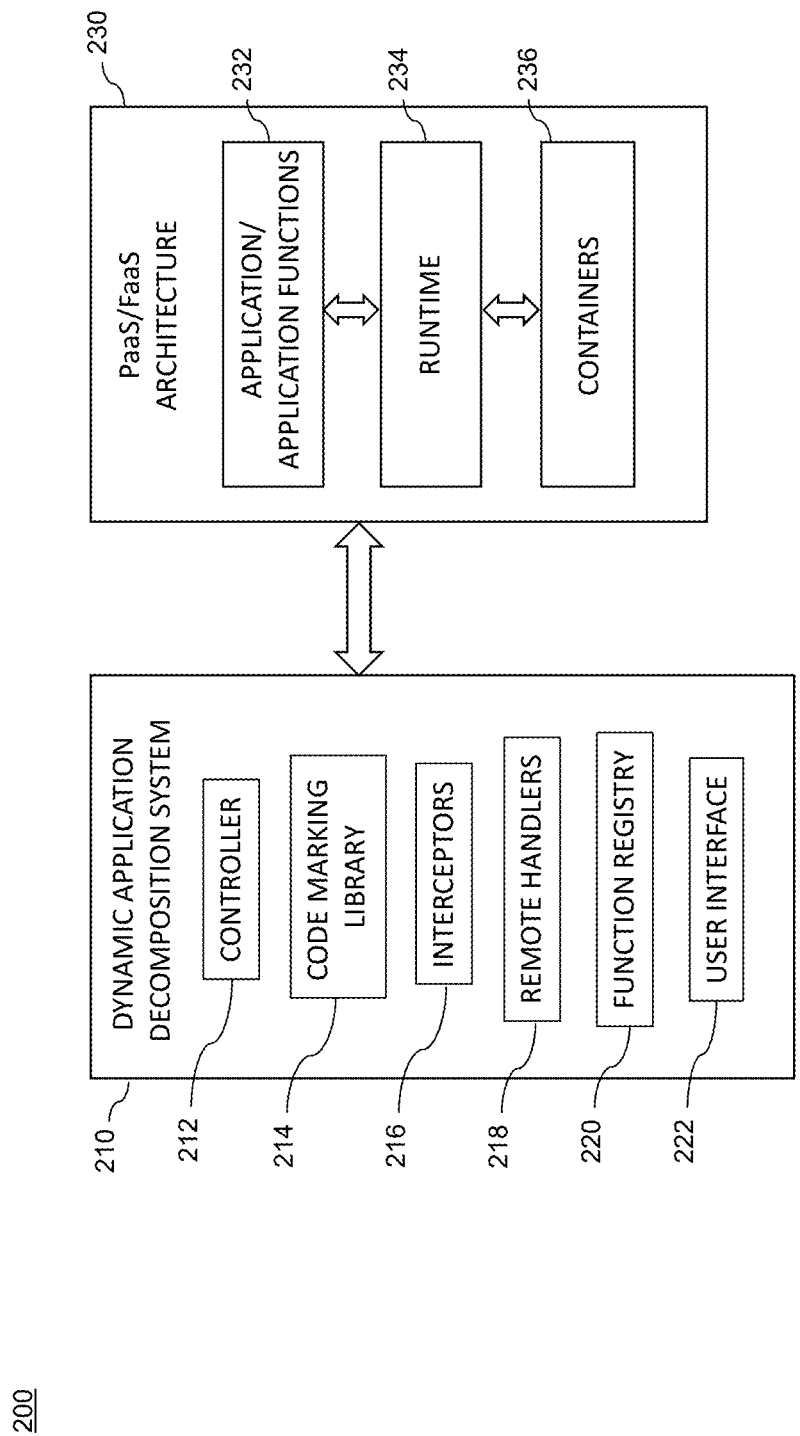
FIG. 2 depicts a computing environment with dynamic application decomposition, according to an illustrative embodiment.

Turning now to FIG. 2, a PaaS/FaaS computing environment with dynamic application decomposition is depicted, according to an illustrative embodiment. More particularly, computing environment 200 comprises dynamic application decomposition system 210 operatively coupled to PaaS/FaaS architecture 230. As shown, dynamic application decomposition system 210 comprises the following modules: a controller 212, a code marking library 214, one or more interceptors 216, one or more remote handlers 218, a function registry 220 and a user interface 222, which will each be described in further detail below. Note that PaaS/

FaaS architecture 230 represents a portion of a PaaS computing environment (e.g., part of PaaS computing environment 100 in FIG. 1A), a portion of a FaaS computing environment (e.g., part of FaaS computing environment 120 in FIG. 1B), or some combination thereof. The architecture 230 is illustrated as a hybrid architecture simply to demonstrate that dynamic application decomposition system 210 can be implemented in any suitable type of computing environment. In particular, as shown, PaaS/FaaS architecture 230 comprises an application (PaaS architecture) and/or application functions (FaaS architecture) 232, runtime environment 234, and containers 236. Interceptors 216, remote handlers 218 and function registry 220, as will be further explained, are implemented in conjunction with containers 236. The user will not directly write them into their own code but rather they will be generated via the function markers/running the system. In some embodiments, interceptors 216, remote handlers 218 and function registry 220 can be run as pieces of code alongside the application.

Illustrative embodiments empower developers to mark their code in order to specify where a piece of functionality can be broken out from the rest of the code and run in a separate standalone container. Dynamic application decomposition system 210 achieves these and other features via controller 212, code marking library 214, interceptors 216, remote handlers 218 and function registry 220.

The code marking library 214 provides developers the ability to annotate their code to mark which functions they want to allow to be run in their own separate containers (e.g., part of containers 236). The functionality behind these markers acts as an interceptor (one or more interceptors 216), i.e., when the functions are called, an interceptor is called instead, allowing redirection of the function invocation to an appropriate remote handler (one or more remote handlers 218) if necessary.

In one or more illustrative embodiments, interceptors 216 are implemented based on the language that the application is written in. For example, AspectJ could be used for Java or function wrapping could be used for Nodejs.

Along with interceptors 216, remote handlers 218 reside within the main/local containers 236. When a function within a container is invoked, a remote handler utilizes a function registry 220 (a map of function labels to function definitions) to determine what code it needs to run, and with what arguments. The remote handler then runs the invoked function.

Controller 212 determines whether the invoked function should be run in an existing container or new container at runtime, based on developer-defined policies, telemetry, and whether the separate container already exists. In some implementations, controller 212 may not be used. In those cases, marked functions can be run in separate containers (or always on the local container, if they want to bypass the dynamic application decomposition system 210).

Together, these components in dynamic application decomposition system 210 add additional value over the current standard of developers manually refactoring the code, since developers will no longer need to physically break up their code to decompose it into functions. Rather, the added annotations allow the application to be logically broken up at runtime. This means the application can remain mostly as it was written (in a monolithic way), but run as a function-based architecture.

At runtime, new functions are spawned up in new containers and calls are redirected automatically, per the decisions of controller 212. The newly spawned functions are also horizontally scalable based on an auto-scaler setting provided by the PaaS/FaaS architecture 230.

More particularly, dynamic application decomposition system 210 further operates as follows. A given remote handler 218 scans the list of marked functions (marked as per code marking library 214) and listens for requests that invoke a particular marked function. Controller 212 determines where to run functions. Depending on the programming language, the developer marks the function that should have the ability to be split off into its own container using an annotation or function wrapper. These pieces of code become new jobs or functions.

Dynamic application decomposition system 210 provides the automation to generate deployment manifests for these jobs or functions based on the existing deployment manifest. The generated deployment manifests contain security specifications that restrict access to the newly generated jobs or functions. The developer can then deploy these new manifests to the PaaS or FaaS computing environment.

At runtime, invocation into marked functions is intercepted by a given interceptor 216 which has been created automatically for each marked function. If controller 212 decides to run the function in a separate container, then a new remote request is made to execute the call in a separate container. The medium for the request could be, for example, Transmission Control Protocol (TCP), HyperText Transfer Protocol (HTTP), Remote Procedure Call (RPC), Simple Object Access Protocol (SOAP), Publish/Subscribe (PUB/SUB), etc. If controller 212 decides not to carry out the call separately, then the interceptor 216 carries out the call locally (inside the existing container). Otherwise, the following steps are followed. The interceptor 216 serializes all arguments of the function and adds them into the body of the remote request. At new container start up time, a remote handler 218 is invoked. Remote handler 218 obtains locations of the marked functions and stores them in function registry 220. When receiving a remote request, remote handler 218 deserializes the arguments, and invokes the appropriate function. The result or error of the invocation is returned to the caller (interceptor 216) as a response. The function interceptor 216 receives the response, deserializes the result or error, and returns the result or error back to the original caller.

User interface 222 provides a visual, text-based, audio, or other user interface through which the developer (or manager, etc.) could interact. For example, the user may wish to easily select functions they would like to define policies for and analyze, and automatically run through a variety of combinations/scenarios to find the one that best optimizes the balance they are seeking between performance and cost (which could be part of the developer-defined policy). Once the best option is identified, the developer selects that option via the user interface (or the best option could be selected based on pre-defined instructions) and the code is automatically updated. In another example, the developer sees a flame graph of which application functions are optimized for performance, and which for cost (or other things), along with where the function is being run. In another example, the developer sees a dashboard with their allocated budget and current usage, and/or metrics regarding their current performance levels across the application. Similarly, the developer sees a visualization of how well optimized a function (or application) is for cost, performance, etc. These items update in real-time as the developer makes changes to the code. Alternatively, the code is updated as the developer interacts with the user interface.

Figure 3:
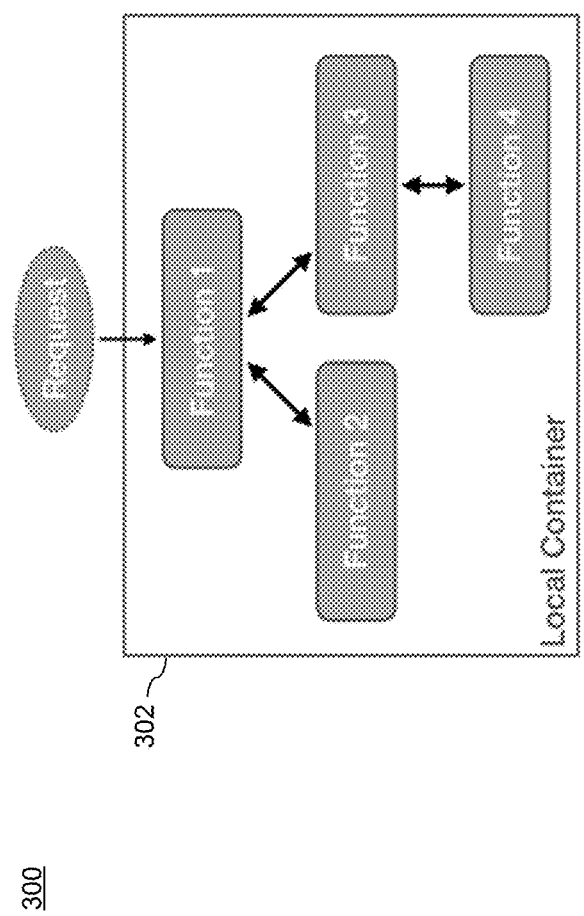
FIG. 3 depicts an example of a call flow for a request to an application with which one or more illustrative embodiments can be implemented.

FIG. 3 shows a call flow 300 for how a request to an application is handled without the use of dynamic application decomposition system 210. The request comes into the local container 302, and the function which was requested is invoked. Any functions which were referenced are also invoked. In call flow 300, this means Function 1 is run which calls Function 2 and Function 3, while Function 3 calls Function 4. Then, the response is sent back to the original requester.

Figure 4:
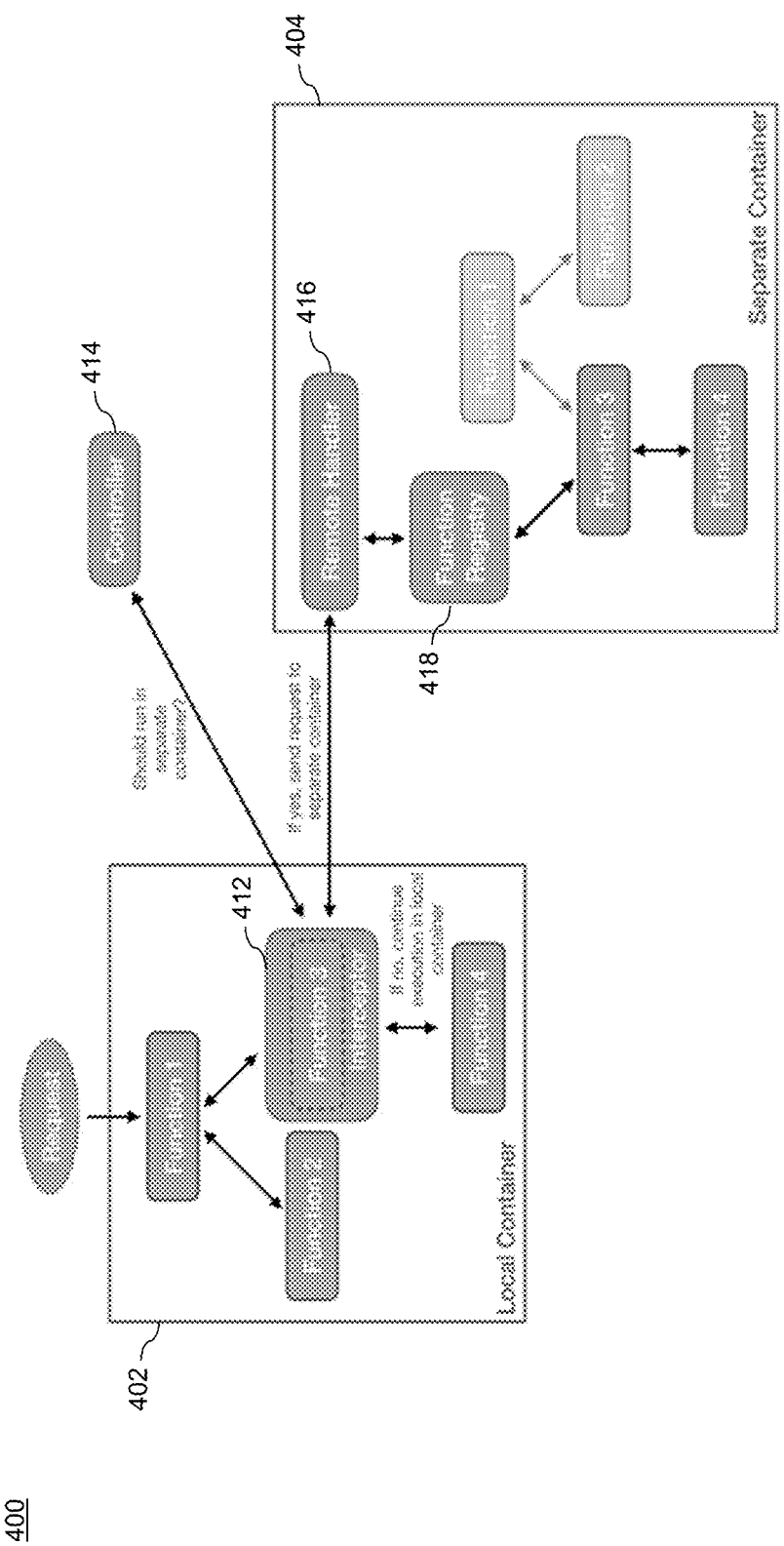
FIG. 4 depicts an example of a call flow for a request to an application with dynamic application decomposition, according to an illustrative embodiment.

FIG. 4 shows a call flow 400 for how a request to an application is handled with the use of dynamic application decomposition system 210. Note that interceptor 412 in FIG. 4 corresponds to one of interceptors 216 in FIG. 2, while controller 414 corresponds to controller 212, remote handler 416 corresponds to one of remote handlers 218, and function registry 418 corresponds to function registry 220.

Assume local container 402 has similar functions as local container 302 in FIG. 3. Function 1 is requested and invoked. Function 1 depends on Function 2 and Function 3, so they are invoked too. However, since Function 3 was previously marked by the developer, the invocation is intercepted by interceptor 412. Interceptor 412 asks controller 414 if the function should be run locally or in a separate container. If controller 414 responds that the function should be run locally, it is run in the local container 402. If controller 414 responds that the function should be run in a separate container, interceptor 412 forwards the request to remote handler 416 in separate container 404. Remote handler 416 finds the function to be invoked via function registry 418, and the function is then invoked, e.g., in this example, Function 3. Note that Function 4 depends from Function 3. The response is then sent back down through each of the previous components until it is received by the original caller.

Note that in separate container 404, Function 1 and Function 2 exist but will never be run there. In call flow 400, Function 1 and Function 2 will only ever be run within the local container 402. However, if they had been marked by the developer, then the call stack would get more complicated as they would have the ability to be run in separate containers as well.

Also note that while call flow 400 includes Function 1 and Function 2 in the separate container 404, they do not necessarily have to exist there. Depending on the implementation, their code could stay in the separate container but remain dormant, or they could be pruned out entirely.

Given the above described illustrative embodiments of dynamic application decomposition system 210, the challenges mentioned above (i.e., (i) effort required to decompose an application; (ii) microservice or function optimization; (iii) on-going maintenance; (iv) dynamic call-flow configuration; (v) dynamic call-flow configuration with telemetry; and (vi) cold start wait time) are addressed as follows:

(i) Effort required to decompose an application. Instead of creating separate container images and refactoring code into separate repositories, developers can simply insert annotations or function wrappers into their code, turning a laborious manual process into a quick and simple one.

(ii) Microservice or function optimization. Oftentimes, development teams do not know exactly how to optimize their application to maximize the balance between performance and cost. By the proposed dynamic application decomposition framework, teams can break down different scenarios to determine which optimizes their application the best, by testing out different scenarios in a production environment. From there, the developer could save various scenarios that they had run, and/or run several simultaneously. This would enable the developer to determine the most optimal scenario for their needs. In addition, with a developer-defined policy, the developer can decide to route a certain percentage of invocations to be executed in the new function's container and the rest to be executed in the local container. This could be done, for example, by the developer specifying in the policy the percentage of the invocations that would be routed to a separate container. This feature is useful for A/B testing to compare performance data for executing in the local container versus in the separate container.

(iii) On-going maintenance. Instead of breaking the application into many pieces and managing multiple Docker images, the application can remain in one piece. The same Docker (container) image can be used so that developers do not need to manage large numbers of Docker images. Developers can manage one code base, one application and one Docker image. They also would not need to change their test suite. The functions they have marked in their code base remain where they are and, as such, can be tested with the existing test suite. The developers can also maintain just a single deployment manifest that has essential information about the current application. This manifest is used to generate the deployment manifests for new jobs and/or functions. Developers can optionally provide a blueprint prior to the generation and/or modify the generated manifests afterwards.

(iv) Dynamic call-flow configuration. With the markers in the code and the controller installed in the PaaS or FaaS computing environment, by using the controller, the developer can directly create and manage policies that would alter runtime behavior without any further code changes. For example, the developer can change the policy of a spawn from "always" to "never" and stop that function from executing in a separate container.

(v) Dynamic call-flow configuration with telemetry. With the markers in the code and the controller installed in the PaaS or FaaS computing environment, the controller can determine dynamically whether to send remote requests to a separate container. For example, when the policy of a spawn is set to "auto", not "always" nor "never", the decision will be made based on expected or known execution time, traffic volume, resource consumption, available resource in cluster and other factors. For example, if too many resources are being used or are expected to be used, or if there is a high volume of traffic, then the controller could decide to break the function out into its own separate container. In the case when the controller decides not to execute remotely, the function invocation will occur in the local container. On the other side, if the controller decides to execute remotely on a FaaS, the controller also takes into consideration a historical start up time of a new container and whether the container is already up-and-running, to determine whether to wait for a new container to be spawned up.

(vi) Container cold-start wait-time. When a function has been invoked by an incoming request, and the following conditions are satisfied:
1. The function is deployed on a FaaS.
2. The marker for this function is added in the code and controller is installed.
3. The policy of the function is set to leave invocation decision to the controller.
4. A separate container for the invoked function does not yet exist, and the controller decides to avoid waiting for the container to start up and execute the function locally.

5. Based on a predictive model, the controller decides that a new container for this function is necessary.

Then, the controller sends a predefined request to initiate a new container for this function. Future requests to invoke the same function can then be routed to the new container without cold-start wait-time, while the current invocation is executed in the local container to avoid wait-time.

Accordingly, dynamic application decomposition system 210 provides many unique advantages over existing application processing approaches. Some of these advantages include the following:

(i) Container spawn with code marker. Instead of manually refactoring existing applications, developers can use code markers, function wrappers or annotations to specify code which should have the ability to run in a separate container. At runtime, containers are generated accordingly, and traffic is redirected to the new containers.

(ii) Dynamic container spawn with developer-defined policies. Instead of hardcoding the decision on whether function spawns will occur, developers can change behavior at runtime without code change. For example, this could be done by communicating to the controller directly to specify "always", "auto" or "never" for each function spawn marked in code.

(iii) Dynamic container spawn with telemetry. When the policy is set such that the decision of where to run the function is left to the controller, the controller decides whether spawning a new container and redirecting traffic is necessary by looking at factors such as execution time, traffic volume, resource consumption, available resources in cluster, etc.

(iv) Avoiding cold-start wait-time. When certain conditions are met (see conditions 1 through 5 above), the controller triggers the initialization of a new container for the invoked function so that future requests can consume the new container without wait-time. In the meantime, the original request, as well as any incoming requests that are received before the new container is created, are processed in the local container.

(v) Partial traffic routing. With a developer-defined policy, the developer can decide to route a certain percentage of invocations to be executed in the new function's container and the rest to be executed in the local container. This could be done, for example, by the developer specifying in the policy the percentage of the invocations that would be routed to a separate container. This feature is useful for AB testing to compare performance data for executing in the local container versus in the separate container.

Given the above described illustrative embodiments of dynamic application decomposition system 210, some examples/use cases will now be described.

Example 1—Running Nodejs Code as Functions on KNative

For a Nodejs application running on Kubernetes, if a developer would like to run a part of the application as a function on KNative, the developer can do the following. In the module containing the function which the developer wishes to mark, find the function declaration statement and update it from the code 502 shown in FIG. 5A to the code 504 shown in FIG. 5B.

This example shows how one would mark function1 in code 504 to be able to be run separately in its own container. In this example, function2 is left untouched. In this example, "marked_function" represents the function wrapper that would return a modified function with an interceptor. This means that when function1 is called, instead of the provided function being called directly, the interceptor will be called which will handle the extra logic. This "marked_function" function invocation is evaluated at application start up time as a top-level function invocation.

To generate a deployment manifest for the newly generated function, the system 210 executes logic that scans for occurrences of "marked_function" in the source code and generates new deployment manifests based on an existing service manifest. For example, command line code 602 in FIG. 6A can be used to generate the manifest.

Where <original knative service file> is the existing service manifest for knative, <root directory> is the root directory of the developer's application source code and <output file> is the location where the new manifest should go. For example, an invocation can be defined as per code 604 in FIG. 6B. Then, the new deployment manifest would be applied to Kubernetes along with the original one as shown in code 606 in FIG. 6C.

At runtime, if the controller decides the invoked function should be run separately, then a new container will be created to run the function. At the start-up time of the new container, "marked_function" registers each marked function into a function registry and invokes the functions accordingly when a request is received.

Example 2—Running Java Code as Container on Kubernetes

For a Java application running on Kubernetes, if a developer would like to run a part of the application in another container on Kubernetes as a long-running job, the developer can add "Marked_function" annotation to the function that should run separately in another container when necessary. For example, if a "sayHello" function already exists, a developer would add the "Marked_function" annotation as shown in code 608 in FIG. 6D.

This method of annotation is different from the function wrapping shown in Example 1. Using AspectJ (an aspect-oriented programming extension for the Java programming language) the same goal of allowing to add an interceptor to the marked function is achieved. The deployment manifest can be generated using command line code 610 in FIG. 6E.

This step is mostly the same as the one shown in Example 1. The first three arguments are the same as in Example 1, however, there is an additional argument at the end to determine the base package of the class that the function belongs to. In this case that is "com.example.helloworld".

In this case, once the new deployment manifest is deployed onto Kubernetes, new containers will be created. When new containers are spawning up, a remote handler is initialized and a scan for methods with "Marked_function" annotation is executed. These functions are added to a function registry as in Example 1.

During runtime, if the controller decides to route a function invocation to a separate container, a remote call is made with the arguments serialized. When the new container receives the remote call, the arguments are deserialized and the appropriate method is called from the function registry. Once the method finishes executing, the result is serialized and sent back to the original container.

Example 3—Customer Focused Interface to Support Composable Strategy

Assume a scenario where optimizations at the hardware level are needed to create better resource utilization and achieve higher power efficiency. In a purely composable (disaggregated) solution, current management paradigms require multiple layers of operations support which is the anti-thesis of the eventual "NoOps" concept many organizations are seeking. NoOps is the concept that an IT environment becomes so automated and abstracted from the underlying infrastructure that there is no need for a dedicated team to manage software. Utilizing dynamic application decomposition as described herein, the abstraction of resource utilization enables the dynamic routing required to specific disaggregated components.

During runtime, since the potential compatible functions may be marked with implemented capabilities/satisfied interfaces, the controller can decide to route a function invocation to a separate abstraction that may be tied to a specific hardware accelerator. The controller participating in the compilation process can facilitate the necessary hardware composition and configuration to support the function type. Considering cost calculations for network latency, some expensive operations for acceleration (e.g., tensor processing unit or TPU) may be highly optimized for a monolithic application specifically without the need to refactor the entire application.

Figure 7:
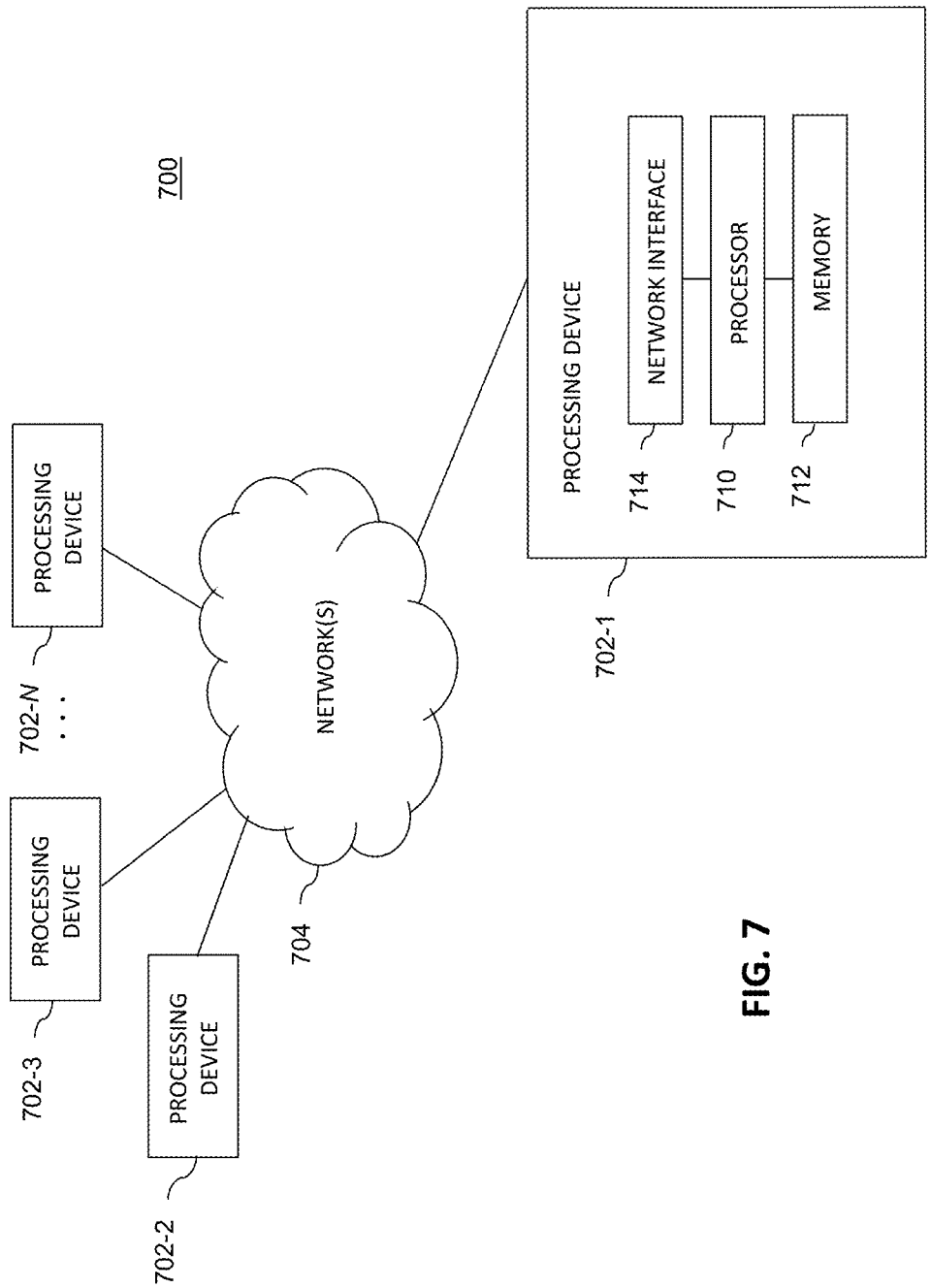
FIG. 7 depicts a processing platform used to implement a computing environment with dynamic application decomposition, according to an illustrative embodiment.

FIG. 7 depicts a processing platform 700 used to implement dynamic application decomposition, according to an illustrative embodiment. More particularly, processing platform 700 is a processing platform on which a computing environment with functionalities described herein (e.g., FIGS. 1-6E and otherwise described herein) can be implemented.

The processing platform 700 in this embodiment comprises a plurality of processing devices, denoted 702-1, 702-2, 702-3, . . . 702-N, which communicate with one another over network(s) 704. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 702 shown in FIG. 7. The network(s) 704 represent one or more communications networks that enable components to communicate and to transfer data therebetween, as well as to perform other functionalities described herein.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6E. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the networks 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers. As illustratively used herein, a container is considered a "virtual computing element" (e.g., unit of software) that packages application code and its dependencies so that the application is executed quickly and reliably from one computing environment to another. A Docker container image is a lightweight, standalone, executable package of software that includes all components needed to execute an application.

The particular processing operations and other system functionality described in conjunction with FIGS. 1-7 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform comprising one or more processing devices;
   the at least one processing platform being configured to:
   execute a portion of an application program in a first virtual computing element, wherein the application program comprises one or more portions of marked code;
   receive a request for execution of a select portion of the one or more portions of marked code;
   decide whether to execute the select portion of marked code identified in the request in the first virtual computing element or in a second virtual computing element; and
   cause the select portion of marked code identified in the request to be executed in the second virtual computing element, when it is decided to execute the select portion of marked code in the second virtual computing element;
   wherein the processing platform comprises a controller module and an interceptor module; and
   wherein the interceptor module associated with the select portion of marked code identified in the request intercepts the request and
   sends a query to the controller module to make the decision whether to execute the select portion of marked code identified in the request in the first virtual computing element or in the second virtual computing element.

2. The apparatus of claim 1, wherein each of the one or more portions of marked code are marked by a function wrapper or an annotation.

3. The apparatus of claim 1, wherein the one or more portions of marked code comprise one or more application functions.

4. The apparatus of claim 1, wherein the first virtual computing element is a first container and the second virtual computing element is a second container remote from the first container.

5. The apparatus of claim 1, wherein the processing platform further comprises one or more remote handler modules and a function registry module.

6. The apparatus of claim 5, wherein the controller module decides whether to execute the select portion of marked code identified in the request in the first virtual computing element or in the second virtual computing element and sends a response to the interceptor module with a decision.

7. The apparatus of claim 6, wherein, when the decision is to execute the select portion of marked code in the first virtual computing element, the interceptor module causes the select portion of marked code to be executed in the first virtual computing element.

8. The apparatus of claim 6, wherein, when the decision is to execute the select portion of marked code in the second virtual computing element, the interceptor module forwards a request to execute the select portion of marked code to a remote handler module associated with the second virtual computing element.

9. The apparatus of claim 8, wherein the interceptor module serializes arguments associated with the select portion of marked code to be executed and adds the serialized arguments to the request sent to the remote handler module.

10. The apparatus of claim 8, wherein the remote handler module utilizes the function registry module to cause execution of the portion of the marked code.

11. The apparatus of claim 10, wherein the remote handler module notifies the interceptor module when there is an error executing the portion of the marked code.

12. The apparatus of claim 1, further comprising sending results associated with the execution of the portion of marked code identified in the request back to a requestor.

13. The apparatus of claim 1, further comprising marking one or more portions of code of the application program to create a library comprising the one or more portions of marked code.

14. The apparatus of claim 1, wherein the processing platform further comprises a cloud-based computing environment service in accordance with which the application program is executed.

15. The apparatus of claim 14, wherein the cloud-based computing environment service comprises a Platform-as-a-Service (PaaS) architecture or a Function-as-a-Service (FaaS) architecture.

16. The apparatus of claim 1, wherein the processing platform further comprises a user interface configured to enable at least one of code optimization and performance metric management.

17. A method comprising:
- executing a portion of an application program in a first virtual computing element, wherein the application program comprises one or more portions of marked code;
- invoking a request for execution of a select portion of the one or more portions of marked code;
- intercepting the request with an interceptor module associated with the select portion of marked code;
- sending, by the interceptor module, a query to a controller module to decide whether to execute the portion of marked code identified in the request in the first virtual computing element or in the second virtual computing element; and
- causing, by the interceptor module, the select portion of marked code identified in the request to be executed in the second virtual computing element, when it is decided by the controller module to execute the select portion of marked code in the second virtual computing element;
- wherein the steps are performed by at least one processing platform comprising one or more processing devices, the one or more processing devices including the controller module and the interceptor module.

18. The method of claim 17, wherein each of the one or more portions of marked code are marked by a function wrapper or an annotation.

19. An article of manufacture comprising a non-transitory processor-readable storage medium having stored therein program code of one or more software programs, wherein the program code when executed by at least one processing device causes the at least one processing device to perform steps of:
- executing a portion of an application program in a first virtual computing element, wherein the application program comprises one or more portions of marked code;
- invoking a request for execution of a select portion of the one or more portions of marked code;
- intercepting the request with an interceptor module associated with the select portion of marked code;
- sending, by the interceptor module, a query to a controller module to decide whether to execute the portion of marked code identified in the request in the first virtual computing element or in the second virtual computing element; and
- causing, by the interceptor module, the select portion of marked code identified in the request to be executed in the second virtual computing element, when it is decided by the controller module to execute the select portion of marked code in the second virtual computing element;
- wherein the at least one processing device comprises the controller module and the interceptor module.

20. The article of manufacture of claim 19 wherein each of the one or more portions of marked code are marked by a function wrapper or an annotation.

* * * * *